US012769491B2

(12) United States Patent
Nojiri et al.

(10) Patent No.: US 12,769,491 B2
(45) Date of Patent: Oct. 20, 2026

(54) READING SYSTEM AND NON-TRANSITORY COMPUTER READABLE STORAGE MEDIUM

(71) Applicant: BROTHER KOGYO KABUSHIKI KAISHA, Nagoya (JP)

(72) Inventors: Hiroya Nojiri, Nagoya (JP); Satoshi Matsushita, Nagoya (JP); Satoru Yanagi, Obu (JP); Tomomi Shiraki, Nagoya (JP); Akihito Uno, Iwakura (JP); Takashi Ohmiya, Nagoya (JP); Daisuke Matsumoto, Nagoya (JP); Katsunori Enomoto, Toyokawa (JP); Thanh Nguyenvan, Nagoya (JP); Toshiki Motoyama, Konan (JP); Toshikazu Hori, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 343 days.

(21) Appl. No.: 18/647,051

(22) Filed: Apr. 26, 2024

(65) Prior Publication Data

US 2024/0361963 A1 Oct. 31, 2024

(30) Foreign Application Priority Data

Apr. 27, 2023 (JP) ................................ 2023-073437
Jan. 19, 2024 (JP) ................................ 2024-006772

(51) Int. Cl.
*G06F 3/12* (2006.01)
*G06F 21/60* (2013.01)

(52) U.S. Cl.
CPC .......... *G06F 3/1238* (2013.01); *G06F 3/1222* (2013.01); *G06F 21/608* (2013.01)

(58) Field of Classification Search
CPC ..... G06F 3/1238; G06F 3/1222; G06F 21/608
See application file for complete search history.

(56) References Cited

U.S. PATENT DOCUMENTS 5,774,720 A * 6/1998 Borgendale ............ G06F 9/451 719/329
11,144,345 B2 * 10/2021 Varadaraj ............... G06F 9/542
(Continued)

FOREIGN PATENT DOCUMENTS

JP 2010-218287 A 9/2010
JP 2014-186681 A 10/2014
JP 2018-037804 A 3/2018

*Primary Examiner* — Iriana Cruz
(74) *Attorney, Agent, or Firm* — Merchant & Gould P.C.

(57) ABSTRACT

A reading system includes a terminal device including a first controller and a storage, and a reading device including a second controller, the reading device being connected to the terminal device and configured to read an object to be read. The storage is configured to store a first program, a second program, and a third program, the first program being an application program corresponding to the reading device, the second program being a general-purpose driver application called from the first program, the third program being a predetermined application program different from the first program and the second program. The second program includes a first mode in which a user interface of the second program is used, and a second mode in which an other user interface that is not the user interface of the second program is used.

8 Claims, 6 Drawing Sheets

(56) References Cited

U.S. PATENT DOCUMENTS

| | | | | |
|---|---|---|---|---|
| 2010/0238480 | A1* | 9/2010 | Fukunishi | G06F 3/1286 358/1.14 |
| 2013/0094042 | A1* | 4/2013 | Hong | H04N 1/00938 358/1.13 |
| 2013/0258405 | A1* | 10/2013 | Tsuya | H04N 1/00241 358/1.15 |
| 2014/0118767 | A1* | 5/2014 | Kim | H04N 1/00225 358/1.13 |
| 2018/0253447 | A1* | 9/2018 | Li | H04N 1/00127 |
| 2021/0092238 | A1* | 3/2021 | Gill | H04N 1/00244 |
| 2024/0104188 | A1* | 3/2024 | Villanueva Gaviola | G06F 21/45 |

* cited by examiner (CONT.)

(FIG. 5 CONTINUED)
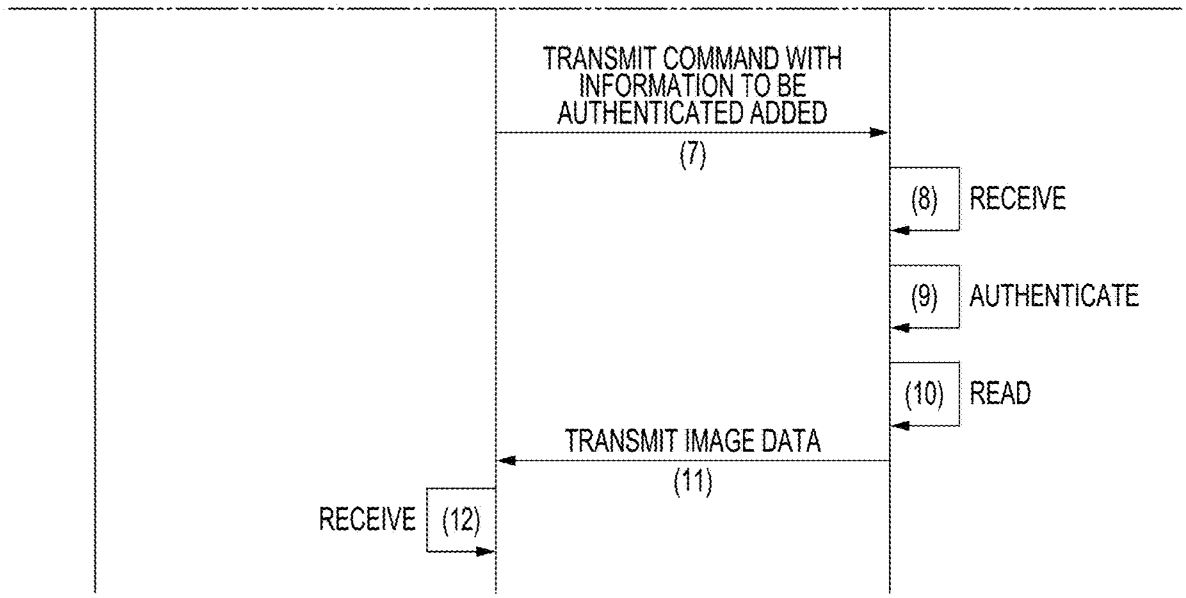

READING SYSTEM AND NON-TRANSITORY COMPUTER READABLE STORAGE MEDIUM

REFERENCE TO RELATED APPLICATIONS

This application claims priority from Japanese Patent Application No. 2023-073437 filed on Apr. 27, 2023 and Japanese Patent Application No. 2024-006772 filed on Jan. 19, 2024. The entire content of the priority application is incorporated herein by reference.

BACKGROUND ART

In a related art, there has been a scan system including an information processing device, a server device, and an image processing device having a scan function, in which the information processing device includes an application and a scanner driver, and uses a TWAIN driver as the scanner driver. In the related art, it is also disclosed that a so-called pull scan is performed.

In the related art, the TWAIN driver, which is a general-purpose driver application (scanner driver), is stored in a storage of a terminal device. The TWAIN driver has a mode in which a user interface of the TWAIN driver is used and a NonUI mode in which another user interface other than the user interface of the TWAIN driver is used.

Here, when a pull scan is performed from the terminal device side, to prevent acquisition of a read image of another user who is not an original user who sets an object to be read in a reading device and to ensure security, it is necessary to authenticate a user name or the like on the reading device side in response to access from the terminal device.

In this case, in a mode using the user interface of the TWAIN driver, it is sufficient to input the user name and the like to the user interface of the TWAIN driver, but the technique cannot be used in the NonUI mode. In the above technique in the related art, no particular consideration is given to such a point, and when the user interface of the general-purpose driver application is not used in the terminal device, it is difficult to execute a pull scan while ensuring security.

An object of the present disclosure is to provide a reading system and a non-transitory computer readable storage medium storing a reading processing program capable of executing a pull scan while ensuring security even in a case where a user interface of a general-purpose driver application is not used in a terminal device.

SUMMARY

A reading system including: a terminal device including a first controller and a storage; and a reading device including a second controller, the reading device being connected to the terminal device and configured to read an object to be read, in which the storage is configured to store a first program, a second program, and a third program, the first program being an application program corresponding to the reading device, the second program being a general-purpose driver application called from the first program, the third program being a predetermined application program different from the first program and the second program, the second program includes: a first mode in which a user interface of the second program is used; and a second mode in which an other user interface that is not the user interface of the second program is used, the first controller is configured to execute: by the third program, reception processing of receiving an input of user authentication information; information creation processing of creating information to be authenticated for authentication in the reading device, using the user authentication information received by the third program in the reception processing; and by the second program, first command transmission processing of transmitting a scan execution command together with the information to be authenticated, and the second controller is configured to execute: first command reception processing of receiving the transmitted information to be authenticated and scan execution command; and scan-related processing of performing processing related to a scan, in accordance with the received information to be authenticated.

A non-transitory computer readable storage medium storing a reading processing program executed by a calculation unit of a terminal device, in which the terminal device is connected to a reading device configured to read an object to be read, and the terminal device including the calculation unit and a storage, the storage includes a first program, a second program, and a third program, the first program being an application program corresponding to the reading device, the second program being a general-purpose driver application called from the first program, and the third program being a predetermined application program different from the first program and the second program, and the second program includes: a first mode in which a user interface of the second program is used; and a second mode in which another user interface that is not the user interface of the second program is used, and the reading processing program including instructions, when executed by the calculation unit, causing the calculation unit to execute: a reception procedure of receiving an input of user authentication information; and an information creation procedure of creating information to be authenticated for authentication in the reading device, using the user authentication information received in the reception procedure.

DESCRIPTION

Next, a reading system according to an embodiment of the present disclosure will be described with reference to the drawings.

First Embodiment

Figure 1A:
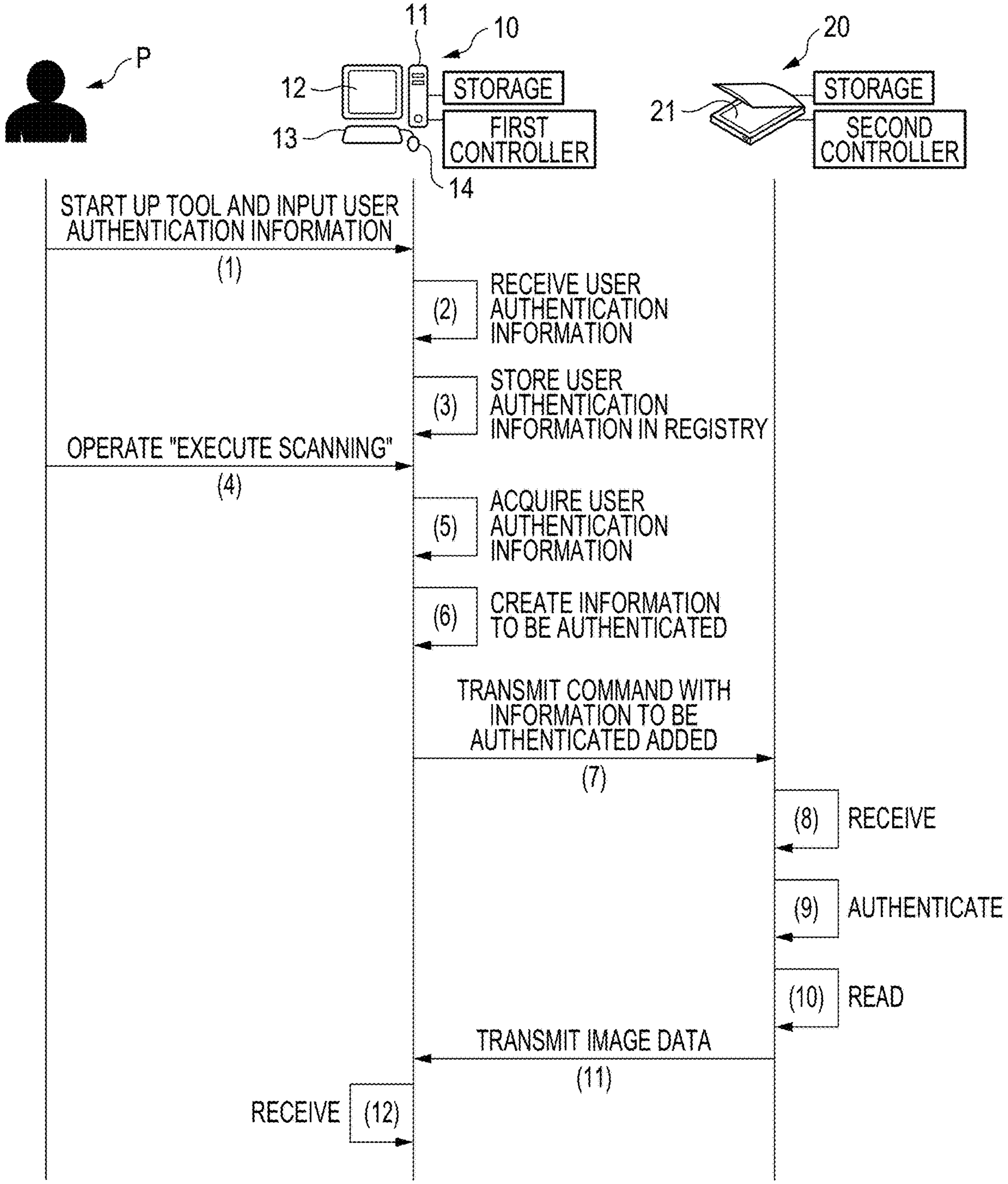
FIG. 1A is a diagram showing an example of a configuration and a processing procedure of a reading system.

FIG. 1A is a diagram showing an example of a configuration and a processing procedure of a reading system. In FIG. 1A, processing between a user P (hereinafter, also referred to as a "user" or an "operator") using the reading system in the present embodiment, a general-purpose personal computer 10 (hereinafter, also simply referred to as a "PC 10") as a terminal device operated by the user P, and a reading device 20 configured to execute reading of an object to be read (hereinafter, also referred to as a "medium to be read") such as a book or a document (not shown) is represented.

The PC 10 includes, for example, a main body 11 including a CPU serving as a first controller and a storage including a storage medium such as a large-capacity hard disk drive, a ROM, and a RAM, a display screen 12, and a keyboard 13 and a mouse 14 serving as an operation unit. Therefore, in the following description, processing executed by the first controller and the storage is simply described as being executed by the PC 10.

As the PC 10 as the terminal device, in addition to the desktop personal computer described above, a notebook personal computer or a terminal device having a computer function such as a tablet terminal (including a smartphone or the like) can be applied in general.

The reading device 20 includes a reading surface 21 made of transparent glass or the like on which a medium to be read is placed. The reading device 20 further includes a CPU serving as a second controller, a reading unit for reading an image, and a storage made of a storage medium such as a hard disk drive, a ROM, and a RAM storing an application for executing reading, by the CPU, including temporary storage of image data of an image read by the reading unit and drive control over the reading unit. Therefore, in the following description, processing executed by the second controller and the storage is simply described as being executed by the reading device 20.

The reading device 20 is connected to the PC 10 in a wired or wireless manner. The reading device 20 is at least configured to execute a pull scan in which the user P operates the PC 10 to cause the reading device 20 to read a medium to be read. The reading device may be configured to, in combination with the pull scan, execute a push scan in which image data read by the user P operating the reading device 20 is transmitted to the PC 10, another personal computer, or a storage medium (for example, an SD card).

Here, the storage of the PC 10 according to the present embodiment is configured to store a first program (hereinafter, also simply referred to as "scan app") that is an application program corresponding to the reading device 20, a second program (hereinafter, also simply referred to as "TWAIN" or "TWAIN driver") that is a general-purpose driver application called from the first program, and a third program (hereinafter, also simply referred to as "predetermined app") that is a predetermined application program different from the first program and the second program.

The CPU serving as the first controller of the PC 10 is configured to execute a first mode (hereinafter, also referred to as a "UI mode") in which a user interface of the TWAIN driver is used, and a second mode (hereinafter, also referred to as a "NonUI mode") in which another user interface that is not the user interface of the TWAIN driver is used.

The display screen 12 of the PC 10 is configured to display, for example, an icon for activating and selecting the predetermined app and an icon for activating and selecting the TWAIN driver, in a case where an operating system is started. Accordingly, the user P can execute each reading mode (UI mode, NonUI mode, or the like) by clicking and selecting an icon with a mouse operation.

Next, processing procedures of the PC 10 and the reading device 20 as an example of use of the reading system according to the present embodiment will be described. In FIG. 1A, an outline of processing contents including various processing procedures is written in text, and an example of a processing order is shown with numbers in parentheses. The processing order shown in FIG. 1A does not limit the processing order and contents of the processing procedures for the various processing procedures described in the claims. An order of the processing procedures is freely changed as necessary, a processing procedure including an interrupt is freely added, and the like.

Figure 2:
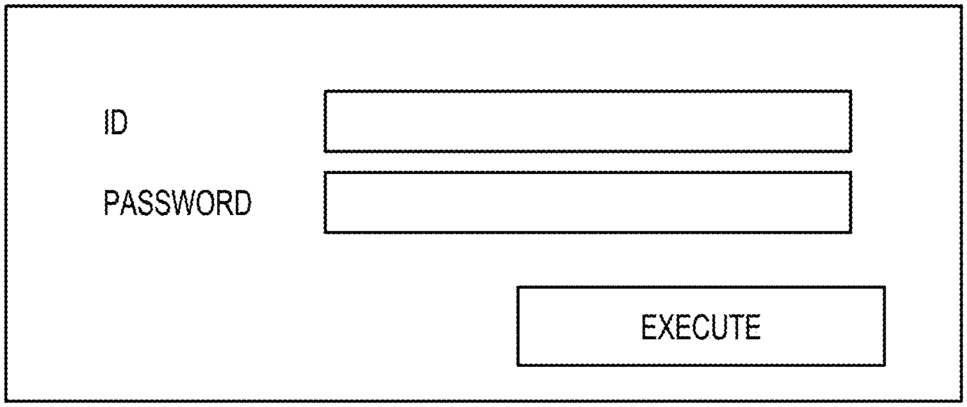
FIG. 2 is a diagram showing an example of an input screen for a user name (ID) and a password.

The predetermined app according to the present embodiment may include an operating system. Accordingly, in a case where the PC 10 is started up, the user inputs a user name (=identification information on the user, hereinafter, also simply referred to as "ID") and a password for identifying authority, for example, whether to start up as an administrator or a general user when signing in, and the user name and the password can be received, and the user name and the password can be stored in the storage of the PC 10. The user name and the password are examples of user authentication information. Alternatively, in the predetermined app according to the present embodiment, for example, in a case where a dedicated scan management application or the like is used and, for example, an icon corresponding to the scan management application is clicked (or tapped), an input screen for inputting a user name (ID) and a password as shown in FIG. 2 is displayed on the display screen 12 and the user inputs the user name and the password, and the user name and the password can be received, and the user name and the password can be stored in the storage of the PC 10.

Therefore, "the user inputs the user name and the password" using various predetermined apps corresponds to "(1) start up tool and input user authentication information" shown in FIG. 1A, "the user name and the password is received" corresponds to "(2) receive user authentication information" shown in FIG. 1A, and "the user name and the password is stored in the storage of the PC 10" corresponds to "(3) store user authentication information in registry" shown in FIG. 1A.

That is, the first controller of the PC 10 is configured to execute, by the third program (predetermined app), reception processing of receiving an input of a user name and a password and, by the third program (predetermined app), storage processing of storing the received user authentication information in a registry.

Figure 3:
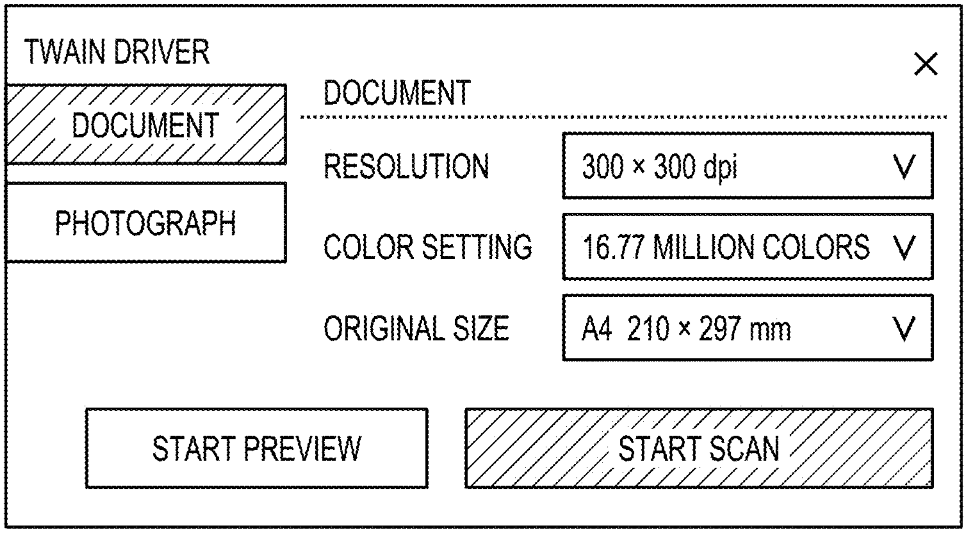
FIG. 3 is a diagram showing an example of a scan execution screen using a TWAIN driver.

Next, after placing the medium on the reading surface 21 of the reading device 20, the user P clicks (or taps), for example, an icon for activating and selecting the TWAIN driver, activates a scan screen (TWAIN driver) as shown in FIG. 3, and then adjusts various settings, and operates "start scan" (or "start preview"). Therefore, the PC 10 starts a scan mode according to the first mode (UI mode) using the second program (TWAIN driver).

That is, the first controller of the PC 10 is configured to start the scan mode as "operate "execute scanning"" shown in FIG. 1A, in a case where the user P operating "start scan" (or "start preview") on the scan screen (TWAIN driver), which is a trigger.

Next, the first controller of the PC 10 is configured to acquire the user name and the password from the storage, and then creates, for example, information to be authenticated in which the user name and the password are encrypted or the information to be authenticated which is associated with the user name and the password and is registered in advance in relation to reading authority (reading restriction) related to use of the reading device 20. Further, the first controller of the PC 10 is configured to generate a command in which the information to be authenticated is added to the read information corresponding to various read conditions such as resolution and color setting shown in FIG. 3, and is configured to transmit the command to the reading device 20.

Therefore, "acquire the user name and the password from the storage" described above corresponds to "(5) acquire user authentication information" shown in FIG. 1A, creation of each "information to be authenticated" described above corresponds to "(6) create information to be authenticated" shown in FIG. 1A, and "generate a command in which the information to be authenticated is added to the read information and transmit the command to the reading device 20" corresponds to "(7) transmit command with information to be authenticated added" shown in FIG. 1A.

That is, the first controller of the PC 10 is configured to execute acquisition processing of reading and acquiring the user name and the password stored in the registry by the second program (TWAIN), information creation processing of creating information to be authenticated for authentication in the reading device 20 using the acquired user name and the password by the third program (predetermined app), and first command transmission processing of transmitting a scan execution command together with the information to be authenticated created by the second program (TWAIN).

In contrast, in a case where the command with the information to be authenticated (scan execution command) is transmitted from the PC 10, and the second controller of the reading device 20 receives the command, the second controller of the reading device 20 compares the command with authentication information related to a scan use mode or the like of the user stored in advance in the storage of the reading device 20 and makes an authentication determination as to whether reading may be executed. Then, in a case where a determination result is successful, the second controller reads the medium and temporarily stores the medium, and for example, after generating image data for the read image of each medium in a predetermined image format (for example, GIF or JPG), the image data is transmitted to the PC 10.

Therefore, "receive the command (scan execution command)" described above corresponds to "(8) receive" shown in FIG. 1A, "authentication determination as to whether reading may be executed" described above corresponds to "(9) authenticate" shown in FIG. 1A, and "the image data is transmitted to the PC 10" corresponds to "(11) transmit image data" shown in FIG. 1A.

That is, the second controller of the reading device 20 is configured to execute first command reception processing of receiving the transmitted information to be authenticated and scan execution command, and scan-related processing of performing processing related to a scan according to the received information to be authenticated.

"Read the medium to be read and temporarily store the medium to be read" by the second controller of the reading device 20 corresponds to "(10) read" shown in FIG. 1A. Specific examples of the scan-related processing include first authentication processing (the above-described processing (9)) of performing authentication on the information to be authenticated, first reading processing (the above-described processing (10)) of reading the object to be read in a case where the authentication is successful, and first image transmission processing (the above-described processing (11)) of transmitting the read image that is read.

Accordingly, the first controller of the PC 10 is configured to receive the image data read by the reading device 20 using the second program (TWAIN driver), store the image data, for example, in the storage of the PC 10 or another portable storage medium (SD card memory, USB memory, or the like), display the image data on the display screen 12, and use the image data for image editing work using an image editing app or the like.

Therefore, "receive image data" described above corresponds to "(12) receive" shown in FIG. 1A.

That is, the first controller of the PC 10 is configured to execute first read image reception processing of receiving the transmitted read image.

Thus, in the reading system according to the present embodiment, the second program (TWAIN driver), which is a general-purpose driver application, is stored in the storage of the PC 10. The second program (TWAIN driver) has a first mode in which the user interface of the second program (TWAIN driver) is used, and a second mode in which another user interface other than the user interface of the second program (TWAIN driver) is used.

Here, the first controller of the PC 10 uses the third program to execute the reception processing and the storage processing of the user name (ID) and the password in advance before executing scanning.

The first controller of the PC 10 is configured to receive the input of the user name and the password by the third program in the reception processing, and is configured to store the user name and the password received in the reception processing in the registry by the third program in the storage processing. Accordingly, the second program (TWAIN driver) is configured to read and acquire the user name and password stored in the registry in the acquisition processing.

Thereafter, to cause the reading device 20 to perform the above-described authentication, the PC 10 uses the acquired user name and password to create the information to be authenticated by the third program in the information creation processing. The information to be authenticated may be created using the first program or the second program instead of the third program. Then, the second program (TWAIN driver) transmits the created information to be authenticated and the scan execution command in the first command transmission processing.

Accordingly, after receiving the transmitted information to be authenticated and scan execution command in the first command reception processing, the second controller of the reading device 20 can perform authentication according to the information to be authenticated. In a case where the authentication is successful, a read image of the object to be read is transmitted to the PC 10 in the first image transmission processing.

As a result, even in a case where a user interface of a general-purpose driver application is not used in the PC 10, it is possible to smoothly execute the pull scan while ensuring security.

Figure 1B:
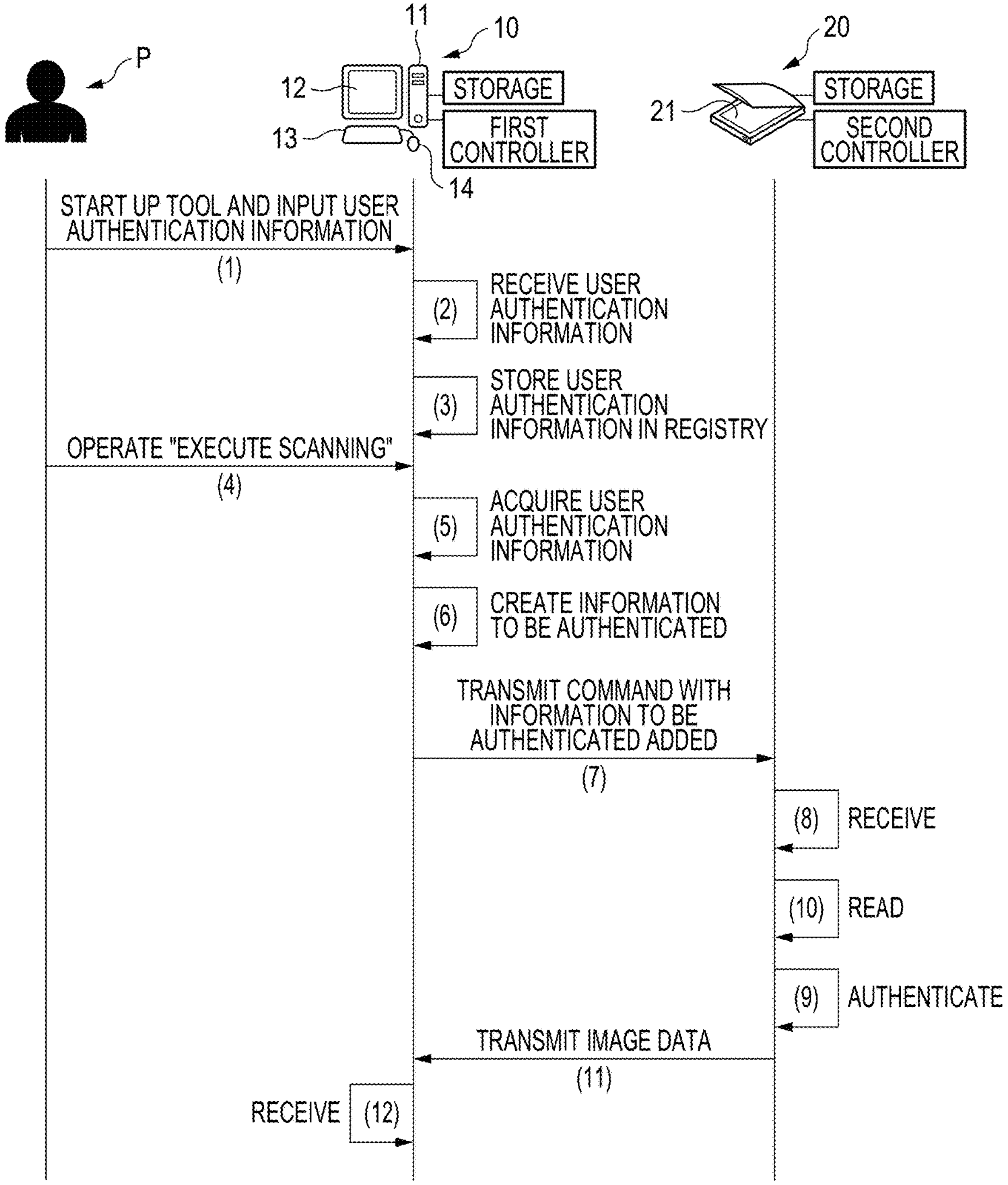
FIG. 1B is a diagram showing another example of the configuration and the processing procedure of the reading system.

As shown in FIG. 1B, an order of "(9) authenticate" and "(10) read" described above may be reversed. That is, in this case, in a case where the command with the information to be authenticated (scan execution command) is transmitted from the PC 10, and the second controller of the reading device 20 receives the command, the second controller of the reading device 20 first reads the medium and temporarily stores the medium (second reading processing, processing (10) shown in FIG. 1B), and for example, generates image data for a read image of each medium in a predetermined image format (for example, GIF or JPG). Thereafter, the command is compared with the authentication information related to the scan use mode or the like of the user stored in advance in the storage of the reading device 20, and an authentication determination is made as to whether reading may be executed (second authentication processing, processing (9) shown in FIG. 1B), and in a case where a determination result is successful, the image data generated as described above is transmitted to the PC 10 (second image transmission processing, processing (11) shown in FIG. 1B).

In this case as well, a similar effect as described above can be obtained.

Second Embodiment

In the first embodiment, the PC 10 is configured to acquire necessary user authentication information by the third program (predetermined app) before executing an actual scan (read), and uses the information to be authenticated based on the user authentication information for authentication in the reading device 20.

In contrast, there may be a case where the user does not know that authentication based on the user authentication information as described above is required.

Figure 4:
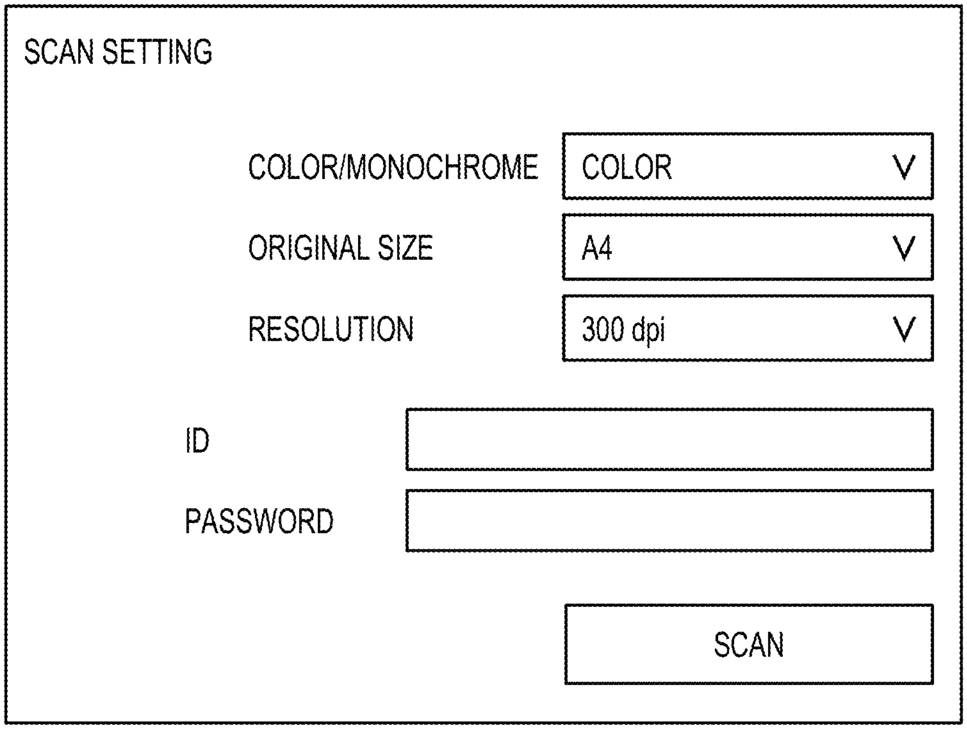
FIG. 4 is a diagram showing an example of a scan setting screen using an application driver.

For example, in a case where the reading device 20 is used, it is considered that, for example, a driver (for example, the TWAIN driver=the second program) corresponding to models of all manufacturers that execute scanning with contents of the display screen shown in FIG. 1A and a driver (for example, a dedicated application program=the first program) corresponding to each model unique to the manufacturer that executes scanning with the contents of the display screen shown in FIG. 4, that is, after inputting the user name (ID) and the password, are present in a drive driver (application) and can be selectively used.

Figure 5:
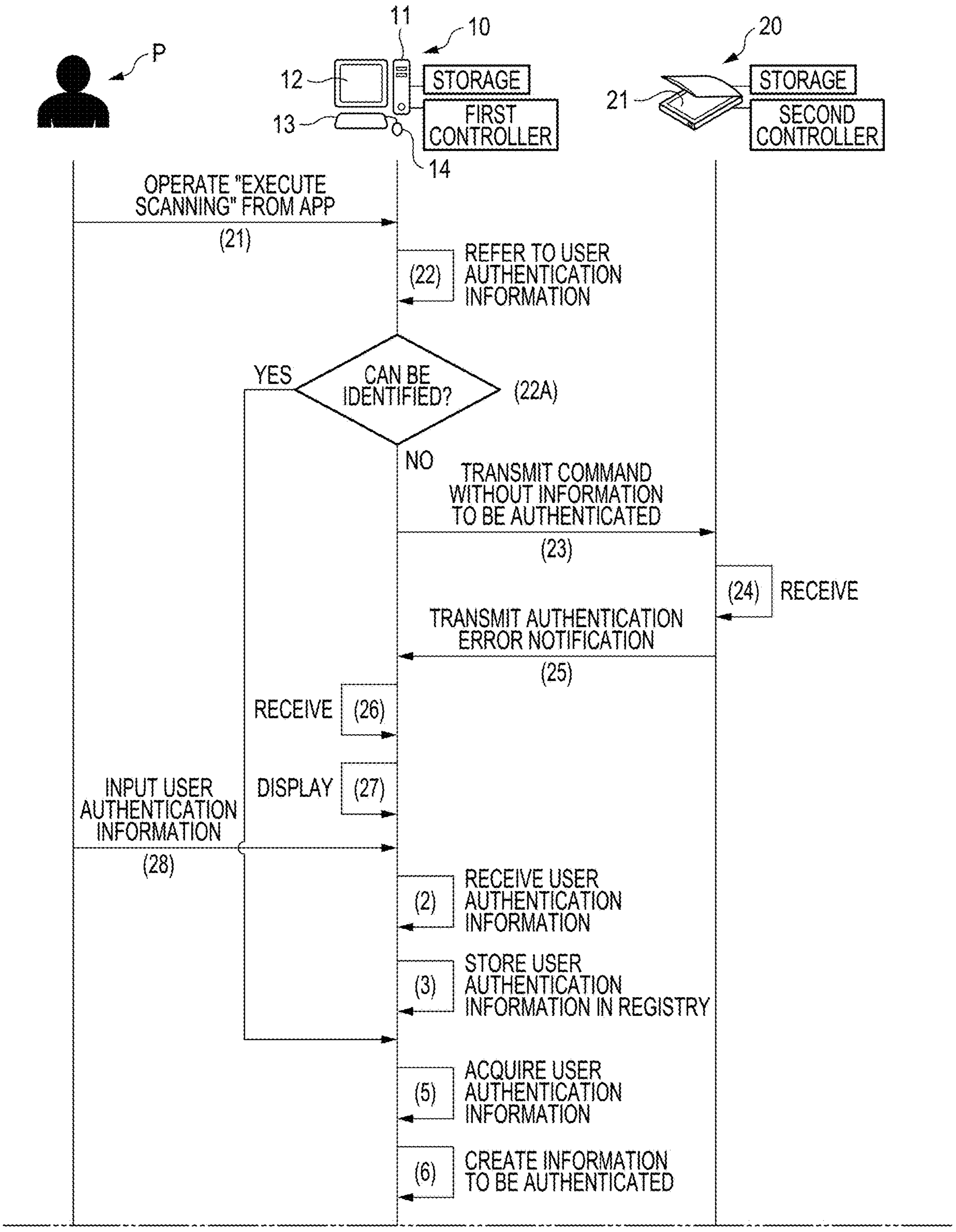
FIG. 5 is a diagram showing a configuration and a processing procedure of another reading system.

In this case, in a case where the user operates scan execution using the TWAIN driver ((21) operate "execute scanning" from the app shown in FIG. 5), the first controller of the PC 10 may refer to the user authentication information from the storage ((22) refer to user authentication information shown in FIG. 5), but the user authentication information may not present ((22A) "can be identified?": No, shown in FIG. 5). Therefore, the command with no information to be authenticated present is transmitted to the reading device 20 ((23) transmit command without information to be authenticated shown in FIG. 5).

In this case, even in a case where the second controller of the reading device 20 receives the received command ((24) receive shown in FIG. 5) and makes an authentication determination, a determination result is negative.

Therefore, the second controller of the reading device 20 transmits an authentication error notification to the PC 10 to request a command including authentication information ((25) transmit authentication error notification shown in FIG. 5).

Accordingly, in a case where the authentication error notification is received ((26) receive shown in FIG. 5), the first controller of the PC 10 displays, on the display screen 12, for example, an input screen for inputting the ID and the password shown in FIG. 2 or an input screen corresponding to a dedicated application shown in FIG. 4 ((27) display shown in FIG. 5), inputs at least the user name (ID) and the password ((28) input user authentication information shown in FIG. 5), and receives the user name (ID) and the password ((2) receive user authentication information shown in FIG. 5).

Therefore, the first controller of the PC 10 is configured to store the user authentication information acquired here, and thereafter can execute the processing of "(5) acquire user authentication information", "(6) create information to be authenticated", and "(7) transmit command with information to be authenticated added" in a similar manner as described above by skipping (4) operate "execute scanning" from the processing procedure shown in FIG. 1A since the execution is already performed in the procedure (21). The second controller of the reading device 20 can execute the processing of "(8) receive", "(9) authenticate", "(10) read", and "(11) transmit image data" in a similar manner as described above. Further, the first controller of the PC 10 can execute the processing of "(12) receive" in response thereto.

As described above, the first controller of the PC 10 is configured to execute, by the second program (TWAIN), reference processing (processing (22)) of referring to the user name and the password stored in the registry, and the second command transmission processing (processing (23)) of transmitting a scan execution command by the second program (TWAIN) in a case where the user name and the password in the registry cannot be identified in the reference processing.

Then, the second controller of the reading device 20 is configured to execute second command reception processing (processing (24)) of receiving the transmitted scan execution command, and notification transmission processing (processing (25)) of transmitting an authentication error notification in accordance with the received scan execution command.

In response to this, the first controller of the PC 10 is configured to execute, by the second program (TWAIN), notification reception processing (processing (26)) of receiving the transmitted authentication error notification, and in response to the received authentication error notification, starts the third program (predetermined app), and executes, by the third program (predetermined app), display processing (processing (27)) of displaying an input screen for inputting the user name and the password on the display 12.

Accordingly, the first controller of the PC 10 is configured to execute the above processing after receiving the input of the user name and the password via the input screen displayed on the display 12 in the reception processing.

In a case where the user name and the password are cached in the storage of the PC 10, that is, in a case where the reading operation is performed again in a state where a reading operation is performed once based on the input of the user name (ID) and the password and the user name (ID) and the password are stored in the storage that is the registry, or in a case where the reading operation is performed again by performing an application operation different from the reading operation, a re-input of the user name (ID) and the password is not required unless the PC 10 is logged off (powered off).

In this case, in a case where the user operates the scan execution using the TWAIN driver ((21) operate shown in FIG. 5) and the first controller of the PC 10 refers to the user authentication information from the storage ((22) refer to user authentication information shown in FIG. 5), the processing of "(22A) can be identified?" shown in FIG. 5 is determined as Yes. In this case, as shown in FIG. 5, the processing (23), (26), (27), (2), (3) by the first controller and the processing (24), (25) by the second controller are omitted, and similar processing after "acquire user authentication information (5)" as described above is executed as it is.

Further, in the flow of the above processing according to a second embodiment, the order of "(9) authenticate" and "(10) read" may be reversed as described above with reference to FIG. 1B.

In the above description, the flowcharts shown in FIGS. 1A, 1B, and 5 do not limit the present invention to the procedure shown in the above flow, and addition or deletion of procedures, change of an order thereof, or the like may be made within a range not departing from a gist and a technical idea of the invention.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A reading system comprising:
a terminal device including a first controller and a storage; and
a reading device including a second controller, the reading device being connected to the terminal device and configured to read an object to be read,
wherein the storage is configured to store a first program, a second program, and a third program, the first program being an application program corresponding to the reading device, the second program being a general-purpose driver application called from the first program, the third program being a predetermined application program different from the first program and the second program,
the second program includes:
a first mode in which a user interface of the second program is used; and
a second mode in which an other user interface that is not the user interface of the second program is used,
the first controller is configured to execute:
by the third program, reception processing of receiving an input of user authentication information;
information creation processing of creating information to be authenticated for authentication in the reading device, using the user authentication information received by the third program in the reception processing; and
by the second program, first command transmission processing of transmitting a scan execution command together with the information to be authenticated, and
the second controller is configured to execute:
first command reception processing of receiving the transmitted information to be authenticated and scan execution command; and
scan-related processing of performing processing related to a scan, in accordance with the received information to be authenticated.

2. The reading system according to claim 1,
wherein the scan-related processing includes:
first authentication processing of authenticating the information to be authenticated;
first reading processing of reading the object, in a case where the authentication by the first authentication processing is successful; and
first image transmission processing of transmitting a read image read by the first reading processing, and
the first controller is configured to execute, by the second program, first read image reception processing of receiving the read image transmitted by the first image transmission processing.

3. The reading system according to claim 1,
wherein the scan-related processing includes:
second reading processing of reading the object;
second authentication processing of authenticating the information to be authenticated; and
second image transmission processing of transmitting a read image that is read in the second reading processing, in a case where the authentication in the second authentication processing is successful, and
the first controller is configured to execute, by the second program, second read image reception processing of receiving the read image transmitted in the second image transmission processing.

4. The reading system according to claim 2,
wherein the terminal device further includes a display,
the first controller is further configured to execute:
by the second program, reference processing of referring to the user authentication information stored in a registry; and
by the second program, second command transmission processing of transmitting the scan execution command, in a case where the user authentication information in the registry is not identified in the reference processing,
the second controller is configured to execute:
second command reception processing of receiving the transmitted scan execution command; and
notification transmission processing of transmitting an authentication error notification, according to the received scan execution command,
the first controller is configured to execute:
by the second program, notification reception processing of receiving the transmitted authentication error notification; and
in response to the received authentication error notification, display processing of starting the third program and displaying an input screen for inputting the user authentication information on the display, by the third program,
in the reception processing, the input of the user authentication information is received via the input screen displayed on the display, and
after the reception processing:
the first controller is configured to execute the information creation processing, the first command transmission processing, and the first read image reception processing; and
the second controller is configured to execute the first command reception processing and the first image transmission processing.

5. The reading system according to claim 4,
wherein in a case where the first controller identifies the user authentication information in the registry in the reference processing:
the first controller is configured to execute the information creation processing, the first command transmission processing, and the first read image reception processing, without executing the second command transmission processing, the notification reception processing, the display processing, and the reception processing; and
the second controller is configured to execute the first command reception processing and the first image transmission processing, without executing the second command reception processing and the notification transmission processing.

6. The reading system according to claim 3, wherein the terminal device further includes a display, the first controller is further configured to execute:

by the second program, reference processing of referring to the user authentication information stored in a registry, and second command transmission processing of transmitting the scan execution command by the second program, in a case where the user authentication information in the registry is not identified in the reference processing, the second controller is configured to execute:

second command reception processing of receiving the transmitted scan execution command; and notification transmission processing of transmitting an authentication error notification, according to the received scan execution command, the first controller execute:

by the second program, notification reception processing of receiving the transmitted authentication error notification; and in response to the received authentication error notification, display processing of starting the third program and displaying an input screen for inputting the user authentication information on the display, by the third program, in the reception processing, the input of the user authentication information is received via the input screen displayed on the display, and after the reception processing:

the first controller is configured to execute the information creation processing, the first command transmission processing, and the second read image reception processing, and the second controller is configured to execute the first command reception processing and the second image transmission processing.

7. The reading system according to claim 6, wherein in a case where the first controller identifies the user authentication information in the registry in the reference processing:

the first controller is configured to execute the information creation processing, the first command transmission processing, and the second read image reception processing, without executing the second command transmission processing, the notification reception processing, the display processing, and the reception processing; and the second controller is configured to execute the first command reception processing and the second image transmission processing, without executing the second command reception processing and the notification transmission processing.

8. A non-transitory computer readable storage medium storing a reading processing program executed by a calculation unit of a terminal device, wherein the terminal device is connected to a reading device configured to read an object to be read, and the terminal device including the calculation unit and a storage, the storage includes a first program, a second program, and a third program, the first program being an application program corresponding to the reading device, the second program being a general-purpose driver application called from the first program, and the third program being a predetermined application program different from the first program and the second program, and the second program includes:

a first mode in which a user interface of the second program is used; and a second mode in which another user interface that is not the user interface of the second program is used, and the reading processing program comprising instructions, when executed by the calculation unit, causing the calculation unit to execute:

a reception procedure of receiving an input of user authentication information; and an information creation procedure of creating information to be authenticated for authentication in the reading device, using the user authentication information received in the reception procedure.

* * * * *